US011429990B2

(12) United States Patent
Aravkin et al.

(10) Patent No.: US 11,429,990 B2
(45) Date of Patent: Aug. 30, 2022

(54) HIGH SPATIAL RESOLUTION PREDICTION

(71) Applicant: Utopus Insights, Inc., Valhalla, NY (US)

(72) Inventors: Aleksandr Y. Aravkin, Bronx, NY (US); Younghun Kim, White Plains, NY (US)

(73) Assignee: Utopus Insights, Inc., Valhalla, NY (US)

( * ) Notice: Subject to any disclaimer, the term of this patent is extended or adjusted under 35 U.S.C. 154(b) by 596 days.

(21) Appl. No.: 14/950,254

(22) Filed: Nov. 24, 2015

(65) Prior Publication Data

US 2016/0321681 A1 Nov. 3, 2016

Related U.S. Application Data

(63) Continuation of application No. 14/855,812, filed on Sep. 16, 2015, now abandoned.

(60) Provisional application No. 62/153,775, filed on Apr. 28, 2015.

(51) Int. Cl.
    *G06Q 30/02*     (2012.01)
    *G06N 20/00*     (2019.01)

(52) U.S. Cl.
    CPC ........ *G06Q 30/0205* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| 2004/0122686 A1* | 6/2004 | Hill | G06Q 30/0202 |
| | | | 705/7.31 |
| 2009/0094328 A1* | 4/2009 | Goodman | G06Q 30/02 |
| | | | 709/204 |
| 2011/0131078 A1* | 6/2011 | Dennard | G06Q 10/10 |
| | | | 705/348 |

FOREIGN PATENT DOCUMENTS

WO      WO-2018175098 A1 *    9/2018      ............. G06N 20/00

OTHER PUBLICATIONS

Huaizhi Wang et. al., "A Review of Deep Learning for Renewable Energy Forecasting," Jul. 17, 2019, Energy Conversion and Management, vol. 198, pp. 1-16 (Year: 2019).*

(Continued)

*Primary Examiner* — Amanda Gurski
(74) *Attorney, Agent, or Firm* — Ahmann Kloke LLP

(57) ABSTRACT

A method, system, and computer program product for managing resources by obtaining a high spatial resolution estimate of behavior adoption are described. The method includes obtaining a low-resolution estimate with a fixed geographic scale, selecting a sample of customers based on the low-resolution estimate, implementing a statistical model to obtain relative probability of adoption of the behavior by each of the sample of customers, and generating a weighted random realization from the sample of customers, the weighted random realization being weighted based on the relative probability of adoption. The method includes iteratively implementing the selecting the sample of customers, the implementing the statistical model, and the generating the weighted random realization to obtain a set of the weighted random realizations, and obtaining the high spatial resolution estimate, providing greater resolution than the low-resolution estimate at a location of interest, based on the set of the weighted random realizations.

8 Claims, 4 Drawing Sheets

(56) References Cited

OTHER PUBLICATIONS

List of IBM Patents or Patent Applications Treated as Related; (Appendix P), Filed Jan. 21, 2016; 2 pages.
Aleksandr Y. Aravkin et al., "High Spatial Resolution Prediction", U.S. Appl. No. 14/855,812, filed Sep. 16, 2015.

* cited by examiner

HIGH SPATIAL RESOLUTION PREDICTION

DOMESTIC PRIORITY

This application is a continuation of U.S. application Ser. No. 14/855,812 filed Sep. 16, 2015 which claims the benefit of U.S. Provisional Application Ser. No. 62/153,775 filed Apr. 28, 2015, the disclosures of both of which are incorporated by reference herein in their entirety.

BACKGROUND

The present invention relates to prediction, and more specifically, to high spatial resolution prediction.

Estimates or projections are often available for a number of behaviors. For example, adoption of a new technology (e.g., cellular technology, green energy technology) or conduct (e.g., recycling) may be projected over a period of time. These projections may help ensure the availability and procurement of necessary components, for example.

SUMMARY

Embodiments include a computer implemented method, system, and computer program product to manage resources by obtaining a high spatial resolution estimate of behavior adoption. The method includes obtaining a low-resolution estimate with a fixed geographic scale, the low-resolution estimate indicating a number of adoptees of the behavior in a specified time period, selecting a sample of customers based on the low-resolution estimate, implementing, using a processor, a statistical model to obtain relative probability of adoption of the behavior by each of the sample of customers, and generating a weighted random realization from the sample of customers, the weighted random realization being weighted based on the relative probability of adoption. The method also includes iteratively implementing the selecting the sample of customers, the implementing the statistical model, and the generating the weighted random realization to obtain a set of the weighted random realizations, and obtaining the high spatial resolution estimate, providing greater resolution than the low-resolution estimate at a location of interest, based on the set of the weighted random realizations.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, projections and estimates of behavior may provide general information about demand for a certain technology or service over a time period. However, this general information is less helpful in planning or preparation for a projected trend at a regional level. For example, a projection that 100,000 to 200,000 residents will adopt a green energy option by 2020 does not clarify where infrastructure changes related to the adoption should be focused. The estimate also does not help target advertising based on likelihood of adoption, for example. While the initial projection or estimate may not provide associated spatial information, other information may be available. For example, with reference to the projection of adoption to a green energy technology, information may be available on people who have already adopted the technology. Embodiments of the systems and methods herein relate to combining a (geographically) fixed scale estimate with statistical modeling to obtain predictions at high spatial resolution. These predictions of behavior help to manage resources more effectively to meet future demand and address shifts in technology usage. Based on embodiments detailed herein, given a projection of 100,000 to 200,000 residents adopting a green energy technology by 2020, a prediction may be made that 30,000 to 35,000 people will adopt the technology in New York City, for example. While the green energy adoption is used for explanatory purposes, the embodiments detailed herein apply, as well, to any number of applications. The outputs facilitated by the detailed embodiments include a prediction of adoption rate (or whatever the initial projection relates to) with high spatial resolution (e.g., a range of numbers of people, households, customers per region, city, zip code) and an indication of uncertainty that is communicated through the range or granularity in the prediction.

Figure 1:
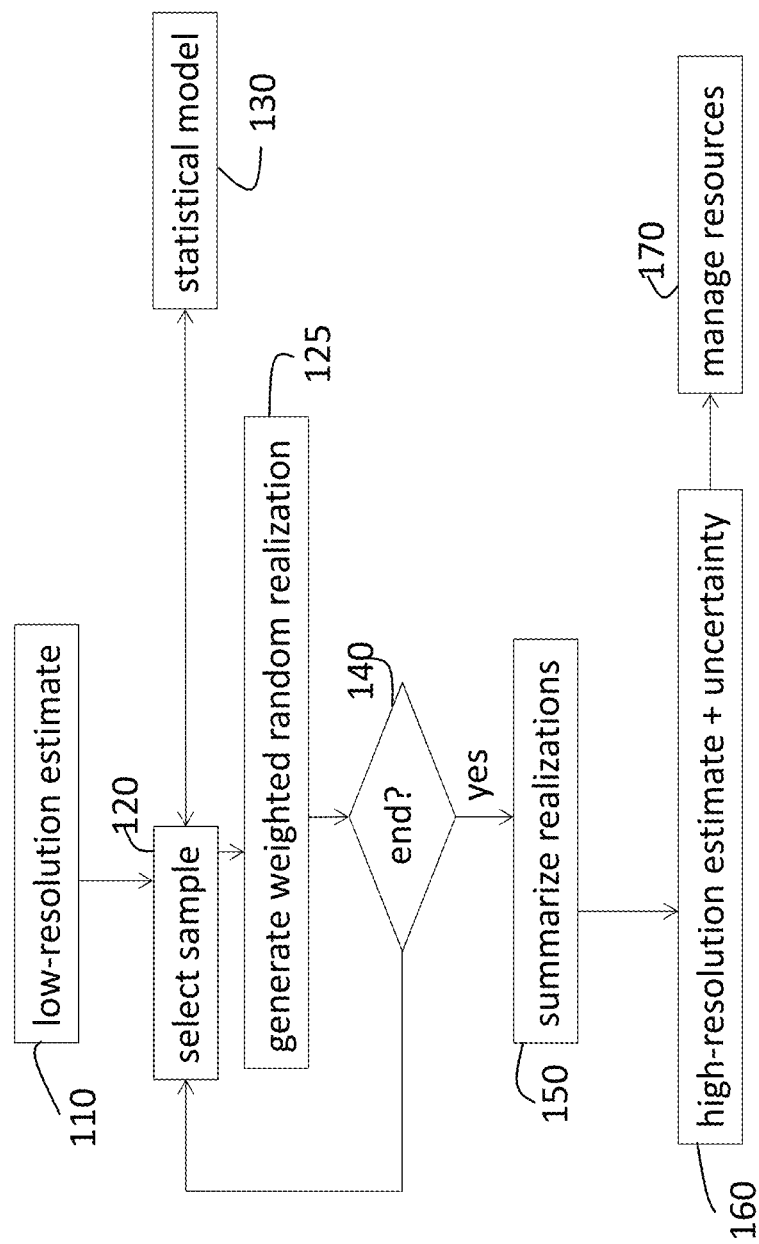
FIG. 1 is a process flow of a method of managing resources based on a high spatial resolution prediction of behavior according to embodiments.

FIG. 1 is a process flow of a method of managing resources based on a high spatial resolution prediction of behavior according to embodiments detailed herein. At block 110, the processes include obtaining a low-resolution estimate of a behavior of interest. For example, the behavior of interest may be adoption of wind energy and the low-resolution estimate—that between 100,000 and 200,000 residents in the United States will use by technology in 2020—may be obtained through polls or other sampling that provides an estimate with a fixed geographic scale (e.g., the United States, in the example). Selecting a sample, at block 120, includes sampling customers according to the low-resolution estimate (obtained at block 110). For example, if 200,000 people in the United States are expected to adopt a behavior (e.g., switch to wind generation) by 2020 according to the low-resolution estimate, then a random sample of 200,000 people may represent a realization. In alternate embodiments, the number sampled as the random realization need not be the same number as in the low-resolution estimate.

Generating a weighted random realization, at block 125, includes executing a statistical model, at block 130, based on the selected sample (at block 120). As the arrow between blocks 120 and 130 indicates, the statistical model is implemented (at block 130) based on inputs relating to the sample of customers (e.g., people, households) generated (at block 120). The statistical model is further discussed below with reference to FIG. 2. The weighting to generate the weighted random realization, at block 125, ensures that customers who are more likely to adopt the behavior of interest are more likely to be part of the random realization. Until an endpoint is reached, at block 140, selecting a sample and generating the weighted random realizations (blocks 120 through 130) are repeated iteratively. For example, a set of 10,000 realizations may ultimately be obtained through the iterative process. While each random realization will have a different sampling of customers, customers given higher weight according to the statistical model (customers who are more likely to adopt the behavior of interest) may be part of more random realizations than other customers. The iterative process may end (at 140) based on a predefined number of random realizations being obtained, for example. In alternate embodiments, other parameters may be used to determine when to stop obtaining random realizations. Alternatively, the iterative process may end when the additional iteration adds negligible changes over the previous iteration. Or the distribution of the random realizations have converged to the desired probability distribution.

Once a set of random realizations has been obtained through the iterative process, summarizing the realizations, at block 150, refers to examining the samples within a specified high-resolution spatial framework (e.g., state, city, county, zip code). Table 1 indicates a summary of a set of 10 realizations within the specified spatial framework of New York City:

TABLE 1

Exemplary summary of realizations

| realization number | number of adopters of the behavior in New York City |
|---|---|
| 1 | 10,000 |
| 2 | 9,788 |
| 3 | 8,567 |
| 4 | 9,000 |
| 5 | 8,000 |
| 6 | 8,544 |
| 7 | 8,800 |
| 8 | 9,200 |
| 9 | 9,500 |
| 10 | 9,400 |

Based on the summary (at block 150), providing a high-resolution estimate and uncertainty, at block 160, may be completed. The high-resolution estimate represents the range captured by a high percentage of realizations (e.g., 90% of the realizations). The percentage may be specified or determined based on other factors. An exemplary factor that affects the percentage of the realizations that are considered is he the accuracy requirements for the investment and upgrade decisions on the existing infrastructure. For example, an electric distribution company may need 95% confidence to install overhead lines to support the anticipated demand increase from the high-resolution estimate for the purpose of the business justification. Thus, 95% of the realizations obtained (at block 150) may be used to determine the high-resolution estimate. In the example shown in Table 1, the high-resolution estimate provides spatial resolution at the level of a city (namely, New York City). The exemplary high-resolution estimate of adopters of the behavior in New York City, according to 90% of the realization summaries shown in Table 1, may be 9199 (average of the highest 90% of realizations) or 8544 (the lowest realization among the highest 90% of realizations). That is, even after a percentage of the realizations is selected, the way that the percentage of realizations is used to obtain a high spatial resolution estimate may be chosen based on business needs. For example, the highest 90% may be used as an aggressive indicator of investment needs while the lowest 90% may be used as a conservative indicator of investment needs. Uncertainty is indicated by the range of realization summary values. In the example shown in Table 1, the uncertainty is 8,000 to 10,000. The wider the range, the more uncertainty there is in the high-resolution estimate. Managing resources, at block 170, is based on the high-resolution estimate and the uncertainty. More planning and action may be taken based on an estimate with less uncertainty than one with more uncertainty. Depending on the behavior that is estimated to be adopted, the planning may include movement of resources to the regions where the most adoption of the behavior is estimated, planning to build infrastructure, and the like.

Figure 2:
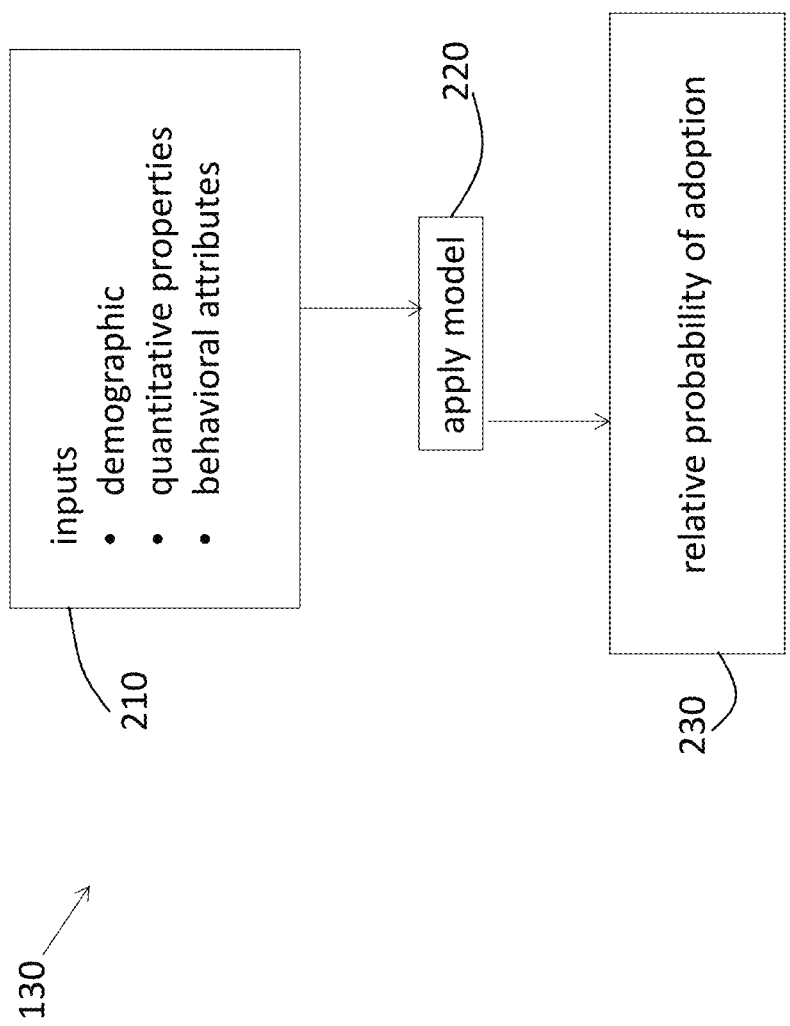
FIG. 2 shows high-level processes associated with executing the statistical model according to embodiments.

FIG. 2 shows high-level processes associated with executing the statistical model (FIG. 1, 130) according to embodiments. The statistical model (FIG. 1, 130) is applied to information about the sample of customers (FIG. 1, 120). At block 210, receiving inputs (associated with the sample of customers) may include receiving information about demographics (e.g., age, number of family members, income, education), properties (e.g., building square footage and cost, number or rooms, current energy usage), and behavior attributes (e.g., proxy measures of interest in the environment, frugality), for example. The inputs may be based on self-reporting (e.g., survey results regarding income), publicly available information (e.g., public records regarding the specifications of a building such as a home), and from memberships (e.g., in environmental groups), for example. Many of the same sources currently used for marketing research may be used to obtain inputs. Applying a model to these inputs, at block 220, includes implementing a support vector machine, logistic regression, neural networks, or random forests, for example. The embodiments are not limited in the statistical models that may be applied. Application of a model to the inputs results in an indication, at block 230, of the relative probability of adoption of the behavior of interest for a given customer. For example, the behavior of interest may be the adoption of photovoltaic technology (solar panels). In this case, the inputs to the statistical model, like the exemplary inputs discussed above, may indicate both the need and interest of customers within a sample realization to adopt the technology. As noted with reference to block 125, the output of the statistical model and, specifically, the relative probability provided for customers within a sample realization, facilitates weighting the realization (FIG. 1, 120).

Figure 3:
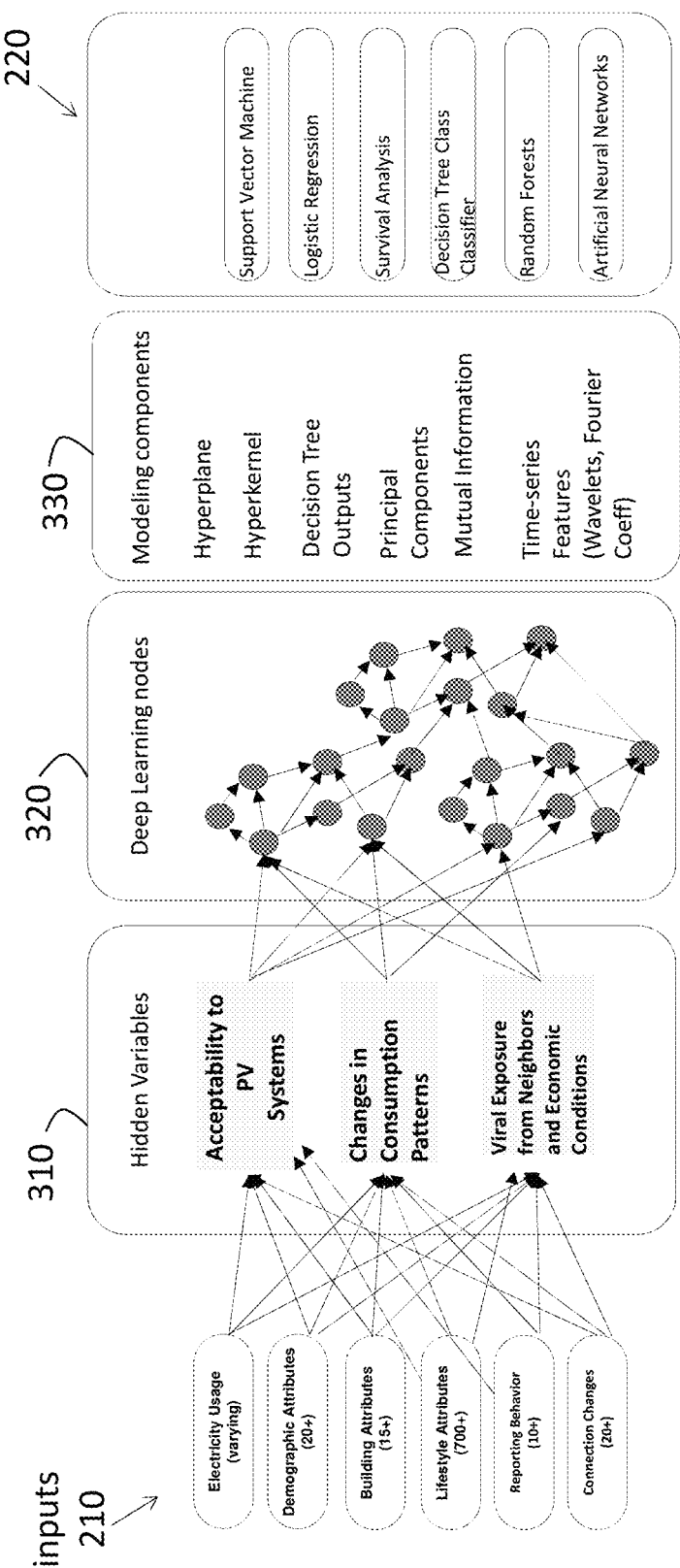
FIG. 3 details processing of inputs performed to implement the statistical model according to embodiments.

FIG. 3 details processing of inputs performed to implement the statistical model according to embodiments. The exemplary statistical model used for explanatory purposes is related to adoption of photovoltaic (PV) or solar energy. Exemplary inputs (FIG. 2, 210) are shown and include electrical usage and a number of attributes. The numbers of each type of attribute are indicated. For example, over 20 demographic attributes (e.g., age, number of family members, income, education) may be obtained. Over 700 lifestyle attributes may be obtained, as indicated in FIG. 3. Exemplary lifestyle attributes may include the number of hours spent in the building in a day, donation patterns to sustainability activities, purchasing behavior of green/sustainable products and services. Hidden variables 310 are obtained from the inputs. Hidden variables 310 refer to the information implied by the inputs or, put another way, information that may be derived from the inputs. In the exemplary case of the behavior of interest being adoption of PV (solar energy), the hidden variables 310 may include acceptability to PV systems, changes in consumption patterns, and viral exposure from neighbors and economic conditions. Viral exposure refers to the influence that a sample consumer's neighbors or economic conditions may have on behavior adoption. For example, people tend to purchase items that neighbors own. Thus, a PV system may be purchased partly due to the fact that neighbors own PV systems (the neighbors' purchases may increase the likelihood of purchase by the sample customer). Deep learning nodes 320 are multi-layer nodes that represent a proxy of hidden variables. According to one exemplary embodiment, the first layer is created by combining the variables from the raw data stream, the second layer is created by combining the composite variables from the first layer and so on. Modeling components 330 are obtained from known solar panel installation cases in the exemplary statistical model. The modeling components may include predictive models using historical PV system adoptions in the context of the building attributes, lifestyle attributes, and energy consumption patterns. The model is applied (FIG. 2, 220) and provided with the information obtained from the inputs (FIG. 2, 210) to provide the relative probability of adoption of the behavior of interest (FIG. 2, 230).

Figure 4:
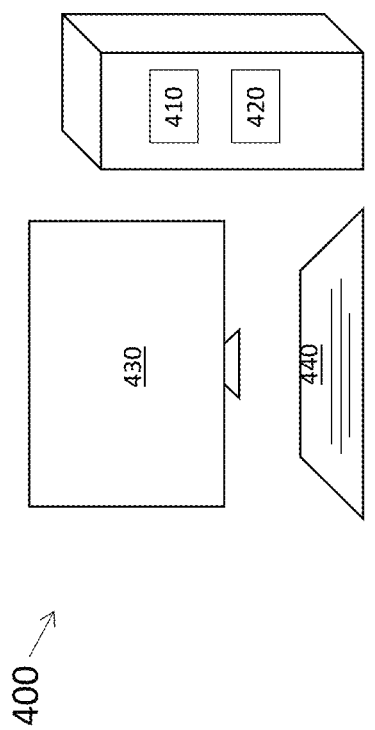
FIG. 4 shows an exemplary system to implement resource management based on high spatial resolution prediction according to embodiments.

FIG. 4 shows an exemplary system 400 to implement resource management based on high spatial resolution prediction according to embodiments. The exemplary system 400 includes one or more memory devices 410 that store instructions and data, and one or more processors 420 that implement the stored instructions and other inputs. The exemplary system 400 may also include input interfaces 440 (e.g., keyboard) and output interfaces 430 (e.g., display device). The interfaces may facilitate wireless communication with other systems and databases, for example, and may be used to obtain inputs for the statistical model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of managing resources by updating a legacy electrical network based on a high spatial resolution estimate of renewable asset adoption, the method comprising:

obtaining a low-resolution estimate with a fixed geographic area, the low-resolution estimate indicating a number of adoptees of renewable assets in a specified time period, each renewable asset of the renewable assets capable of providing energy to the legacy electrical network;

selecting a sample of customers within the fixed geographic area, the sample of customers satisfying the low-resolution estimate;

implementing, using a processor, an artificial neural network model to obtain a relative probability of adoption of renewable assets by each of the sample of customers, the implementing the artificial neural network model including:

obtaining inputs associated with the sample of customers;

deriving hidden variables implied by the inputs associated with the sample of customers;

providing the hidden variables to a plurality of deep learning nodes;

generating, using the processor, a weighted random realization from the of customers, the weighted random realization being weighted based on the relative probability of adoption;

iteratively implementing the selecting the sample of customers, the implementing the artificial neural network model, and the generating the weighted random realization to obtain a set of the weighted random realizations;

obtaining a first high spatial resolution estimate from the set of weighted random realizations based on a threshold range, the first high spatial resolution estimate being generated from a first subset of customers in the sample of customers, the first subset of customers located in a particular geographic location within the fixed geographic area, the first high spatial resolution estimate representing an increasing trend in the probability of adoption;

predicting a distribution of renewable asset adoption in the particular geographic location;

predicting distributions of the legacy electrical network in the particular geographic location based on the first high spatial resolution estimate;

predicting disruptions and outages caused by renewable assets based on the predicted distribution of renewable asset adoption in the particular geographic location; and presenting a roll-out plan for installing any number of overhead lines to be coupled to the legacy electrical network in the particular geographic location based on the first high spatial resolution estimate to and the predicted disruptions and outages caused by the renewable assets to reduce a risk of load caused by the renewable assets.

2. The computer implemented method according to claim 1, wherein the selecting the sample of customers includes selecting a sample size equal to the number of adoptees of a behavior in the specified time period.

3. The computer implemented method according to claim 1, wherein the obtaining the inputs includes obtaining one or more of a demographic information and a behavioral attributes.

4. The computer implemented method according to claim 1, wherein the obtaining the inputs includes determining changes in consumption patterns for the sample of customers.

5. The computer implemented method according to claim 1, wherein the obtaining the high spatial resolution estimate includes obtaining a count of adopting customers among the sample of customers for each iteration at a given location.

6. The computer implemented method according to claim 5, wherein the obtaining the first high spatial resolution estimate includes obtaining a range of the count of adopting customers over all the iterations as an uncertainty in the high spatial resolution estimate.

7. The computer implemented method according to claim 1 further comprising:

obtaining a second high spatial resolution estimate from the set of weighted random realization based on the threshold range, the second high spatial resolution estimate generated from a second subset of customers in the sample of customers, the second subset of customers located in the particular geographic location, the second high spatial resolution estimate representing the increasing trend in probability adoption.

8. The computer implemented method according to claim 7, wherein the managing resources by planning the update of the legacy electrical network in the particular geographic location is further based on a range between the first high spatial resolution estimate and the second high spatial resolution estimate.

\* \* \* \* \*